(No Model.)

W. B. HOLLINGSHEAD.
SECONDARY BATTERY.

No. 422,216. Patented Feb. 25, 1890.

WITNESSES:

INVENTOR:
Wm. B. Hollingshead
By A. P. Thayer
his Attorney

UNITED STATES PATENT OFFICE.

WILLIAM B. HOLLINGSHEAD, OF BRONXVILLE, ASSIGNOR OF ONE-HALF TO SYDNEY H. CARNEY, OF NEW YORK, N. Y.

SECONDARY BATTERY.

SPECIFICATION forming part of Letters Patent No. 422,216, dated February 25, 1890.

Application filed November 27, 1889. Serial No. 331,773. (No model.)

*To all whom it may concern:*

Be it known that I, WILLIAM B. HOLLINGSHEAD, a citizen of the United States, and a resident of Bronxville, in the county of Westchester and State of New York, have invented new and useful Improvements in Storage or Secondary Batteries, of which the following is a specification.

Referring to the accompanying drawings, which represent in three sectional elevations an accumulator or storage-battery, as it may be arranged in as many different forms in accordance with my invention, two elements are taken—one $a$, composed of manganese dioxide, and the other $b$, of metallic iron. They are immersed in water having in solution, preferably, potassium bichromate to act as a conveyer or electrolyte; but permanganate of potash, cyanide of potash, or other equivalent conveyer or electrolyte may be used. In process of electrical action in charging the manganese dioxide constitutes the negative, the iron the positive. The hydrogen eliminated from the positive element reduces the manganese dioxide to a lower oxide, producing water, while the oxygen of the negative element oxidizes the iron. The potassium bichromate or other conveyer or electrolyte is separated into its alkaline and acid constituents, the chromic anhydride being deposited upon the iron or negative element during reverse action in conjunction with the ferric oxide, while the alkaline radical passes to the manganese dioxide or positive (in reverse action) element producing caustic potash, which acts as a conveyer or electrolyte during reverse action.

Figure 1:
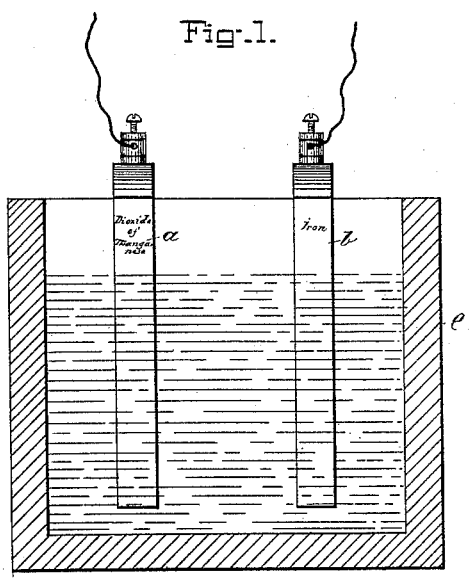
Figure 2:
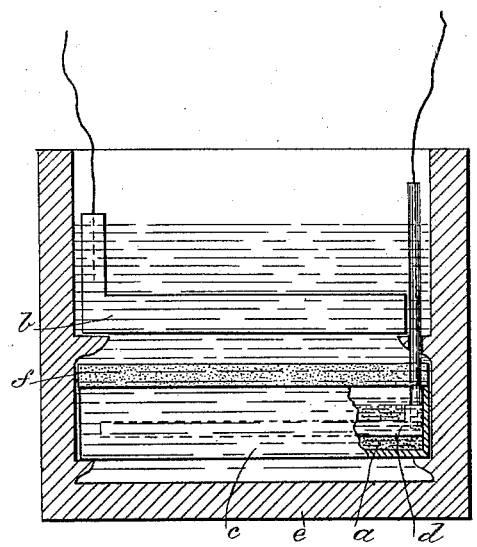
Figure 3:
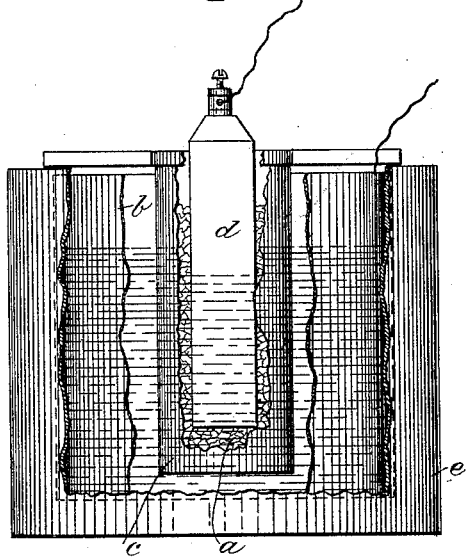

In Figure 1 of the drawings I have represented the manganese dioxide in solid mass; but it may be used as well in plates or in granular or pulverulent form, as in Figs. 2 and 3, in which case it will be applied in a crib or porous cup $c$, or other holder of any approved kind that will not be acted on by the solution, and will have a carbon or iron conductor $d$. The manganese dioxide may also be placed in the porous cup $c$, located in the bottom of the jar $e$, with a porous plate $f$ above, and the iron element $b$ on the porous plate, as in Fig. 2, with the carbon conductor $d$ embedded in the element $a$. The iron element may also be in small particles, if desired, and provided with a conductor.

I claim as my invention—

1. The combination, in a voltaic accumulator or storage-battery, of a plate or mass of manganese dioxide, and a plate or mass of metallic iron and an electrolyte or conveyer composed of water having in solution an acid salt which on decomposition deposits an insoluble compound on the negative or iron plate and a soluble compound on the manganese-dioxide plate, acting as an electrolyte or conveyer during reverse action or discharge.

2. The combination, in a voltaic accumulator or storage-battery, of a mass of manganese dioxide, a conductor therefor, substantially as described, a plate or mass of metallic iron and an electrolyte or conveyer composed of water having in solution an acid salt which on decomposition deposits an insoluble compound on the negative or iron plate and a soluble compound on the manganese-dioxide plate, acting as an electrolyte or conveyer during reverse action or discharge.

In testimony that I claim the foregoing as my invention I have signed my name, in presence of two witnesses, this 20th day of November, 1889.

WM. B. HOLLINGSHEAD.

Witnesses:
 W. B. EARLL,
 W. J. MORGAN.